United States Patent [19]

Brennan et al.

[11] 4,251,240
[45] Feb. 17, 1981

[54] PUMP VALVE ASSEMBLY

[75] Inventors: Walter W. Brennan; Charles R. Myers; Paul E. Perry, all of Jacksonville, Fla.

[73] Assignee: Griffin International, Inc., Irvington, N.Y.

[21] Appl. No.: 38,178

[22] Filed: May 11, 1979

[51] Int. Cl.³ .............................................. B01D 19/00
[52] U.S. Cl. ...................................... 55/168; 55/192; 55/216; 55/467
[58] Field of Search ................ 55/165, 168, 170, 189, 55/192, 216, 467; 137/202, 630.15; 210/115, 120

[56] References Cited

U.S. PATENT DOCUMENTS

| 812,831 | 2/1906 | Davidson | 55/170 X |
|---|---|---|---|
| 1,749,561 | 3/1930 | Cadman | 55/167 |
| 2,313,773 | 3/1943 | Samiran | 55/170 X |
| 2,318,251 | 5/1943 | Moore | 137/202 |
| 2,322,910 | 6/1943 | Adney et al. | 137/202 |
| 3,344,587 | 10/1967 | Wakeman | 55/192 X |
| 3,432,992 | 3/1969 | Moore | 55/170 X |
| 3,726,303 | 4/1973 | Allen et al. | 137/630.15 |

Primary Examiner—John Adee

[57] ABSTRACT

A device for separating air entrained in, and associated with, liquid being pumped. The device comprises a tank member communicating with the intake chamber of a liquid pump and with a vacuum pump. Disposed within the tank member is an open container member having a liquid conduit connected with the intake chamber of the liquid pump. Integrally connected with the top of the tank member is a baffle member which extends downwardly into the container member in such manner that liquid flowing into the container from the tank member flows downwardly between the inner surface of the container and the outer surface of the baffle. Disposed within the container are means responsive to the level of the liquid within the container member. A first valve member responsive to the movement of the liquid level is provided for the discharge of gases into a gas exhaust chamber and out of the device through the vacuum pump. A second valve connected with the atmosphere is disposed in the exhaust chamber and operatively connected to the first valve member in such manner that said second valve is open to the flow of air from the atmosphere when the first valve is closed.

9 Claims, 5 Drawing Figures

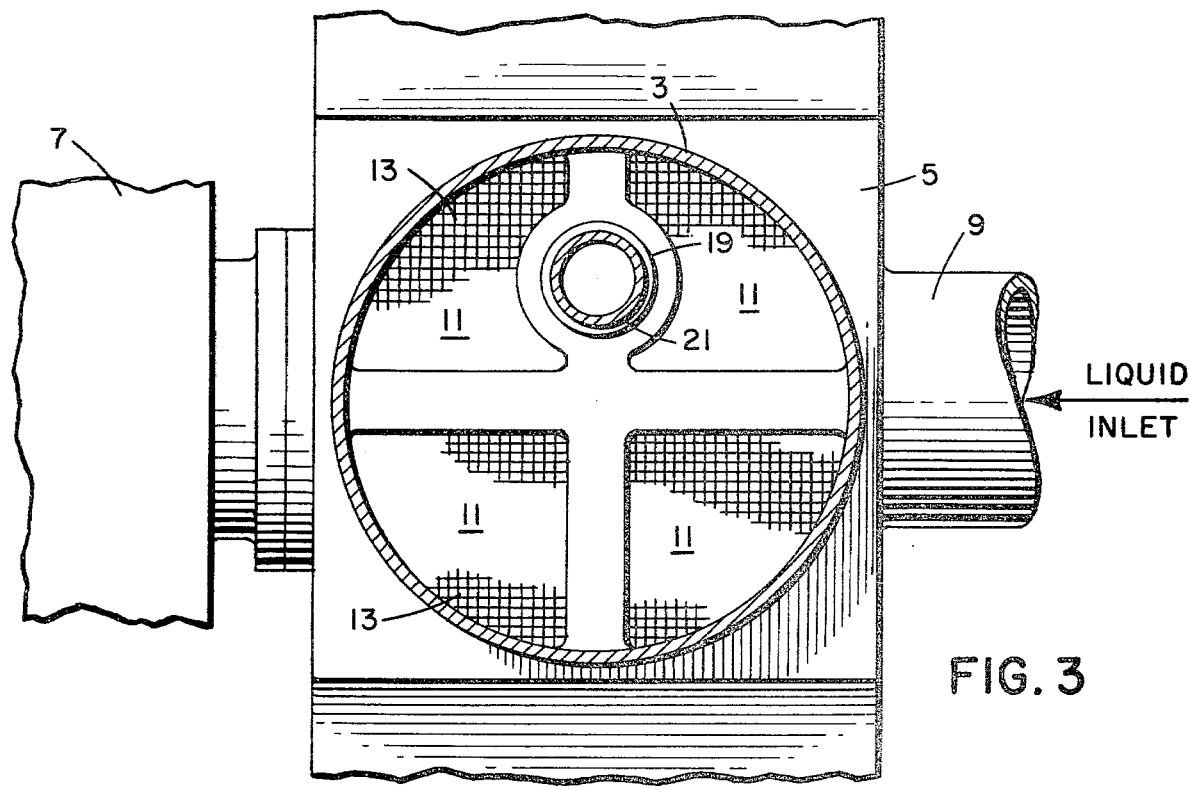
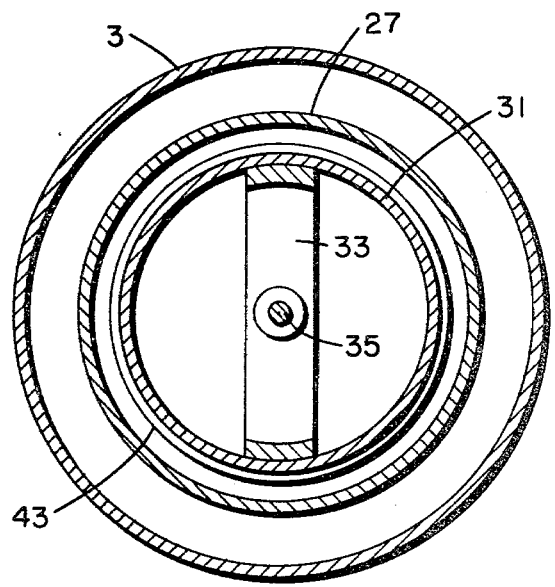
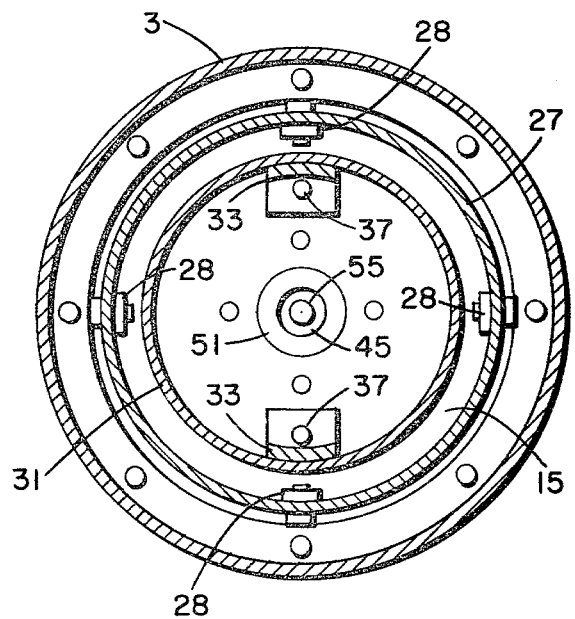

PUMP VALVE ASSEMBLY

BACKGROUND OF THE INVENTION

The invention relates to a device for separating gases entrained with liquids being pumped. More specifically, the invention relates to a device for use in connection with well-head pumps for separating gases from the liquid being pumped. Still more particularly, the invention is concerned with a device for use in wellpoint dewatering systems.

Liquids pumped from below ground level generally contains an amount of air entrained with the liquid. Pumps designed to pump liquids from underground wells are hindered by the problem of separating gases present with the liquid to permit non-aerated liquid to reach the pump. Most well-head pumps are of the centrifugal type which can only reach maximum efficiency when gas free liquids are pumped since the denser liquid enables the pump to move a greater volume of fluid in a given period of time. In any pumping system, the capability of handling large volumes of gases is extremely desirable, for example, a ground dewatering wellpoint system often encounters a situation where the volume of water to be pumped is relatively small compared with the volume of gases extracted. In such systems, i.e., low water volume, it is desirable to connect a number of wellpoints by means of a manifold to a single well-head pump system. The limiting factor, however, is the volume of air that the pumping system can handle. Accordingly, the larger the number of wellpoints that can be handled by a single pump system, the more efficient and economical the operation.

Prior art liquid pumping systems have generally included some method and/or device for separating gases entrained in, and gases present with, the liquid being pumped. Heretofore, none of the known methods and devices have been completely successful in removal of the gases prior to the liquid entering the pump. One of the prior art techniques is shown, for example, in U.S. Pat. No. 2,318,251 to Moore, wherein a centrifugal pump is employed to drive water and a vacuum pump to effect discharge of air entrained in the water. A float member is disposed in a pipe which controls a valve. The valve, responsive to the rise of water in the pipe, controls introduction of air at atmospheric pressure into the pipe, thus reducing the vacuum provided by the vacuum pump.

Other techniques include such systems and devices as taught in U.S. Pat. No. 3,726,303 to Allen et al and U.S. Pat. No. 2,322,910 to Adney et al which disclose modifications of the system taught in Moore (supra) wherein a double valve structure carried by a water-operated float member and disposed within a water-containing chamber is used to seal the chamber from the intake of liquid and vent the vacuum source to air at atmospheric pressure when a rise in the water level causes the float member to rise.

A serious disadvantage of prior art gas and liquid handling valves and pumps resides in the fact that when the air handling pump uses oil to effect a seal, as is common in most vacuum pumps used today, droplets of water and moisture laden air from prior art wellpoint valves will tend to mix with the oil thereby creating sludge and contaminating the oil feed to the air handling pump. While the techniques, devices and systems heretofore proposed and used in the art have ameliorated the situation to some extent, none have provided a simple device which substantially completely separates all gases entrained in, and with, the liquid well ahead of where the gas enters the intake of the air handling and liquid pumps and includes means for automatically controlling the level of liquid within the device so as to prevent the liquid from entering the air handling pump.

SUMMARY OF THE INVENTION

The present invention provides a gas-liquid separation device which may be simply connected to the intake side of a well-head pump and a gas vacuum pump. The device of the invention comprises a tank member connected with the intake chamber of the well-head pump in such manner that liquid with entrained gas flows from the intake chamber of the pump into the tank member of the inventive device. Disposed within the tank member is an open container member having a liquid conduit connected thereto which extends into the intake chamber of the well-head pump. Liquid entering the bottom of the tank member flows upwardly and over the top of and into the container member. Liquid from the intake chamber of the pump also enters the container member through the conduit member. A baffle member continuous with the periphery of container member is mounted on the underside of the top of the tank member which extends downwardly into the container member in such manner that liquid flowing into the container member from the tank member initially flows downwardly between the inner walls of the container and the outer surface of the baffle member. Means are disposed in the container member which are responsive to the liquid level in the container member. In its simplest configuration, a float member is disposed in the container member in such manner as to rise and fall with the level of the liquid in the container. A valved opening in the top of the tank member is connected with a gas exhaust chamber. Operatively connected with the liquid level responsive means in the container member is a valve member which closes the opening between the tank and the gas exhaust chamber. The gas exhaust chamber is connected with a gas vacuum pump. When the valve member is open between the tank member and the gas exhaust chamber, the separation tank is connected directly to the vacuum pump whereby the pressure within the device is reduced. When the float rises, consequently causing the valve to close, increased pressures within the tank and the suction of the well-head pump causes the degased liquid in the container to flow downwardly through the conduit into the intake chamber of the liquid pump.

It was surprisingly discovered that the present invention in normal operation and in a normal well-head pumping system readily handles volumes of gases of up to 120 cubic feet per minute as contrasted to the ability of the prior art devices under the same conditions to handle a maximum of about 60 cubic feet per minute. In practice, it will be readily apparent from the more detailed description hereinafter that the invention additionally offers the advantage of great simplicity and a more complete separation of gases from liquids being pumped than heretofore offered by devices of the prior art. It will also be appreciated that the device provides a more reliable liquid level control system than those provided by prior art devices. The invention also provides a gas-liquid separation device which may be constructed as an integral part of a pump or as a separate unit which may be easily mounted and connected to existing pumps.

BRIEF DESCRIPTION OF THE DRAWINGS

These and other objects, features, and advantages of the present invention will be readily apparent from the following description of the preferred embodiment taken in conjunction with the appended claims and the accompanying drawing figures wherein:

FIGS. 3, 4 and 5 are horizontal, transverse sectional views taken on lines 3—3, 4—4 and 5—5 respectively of FIG. 1.

Figure 1:
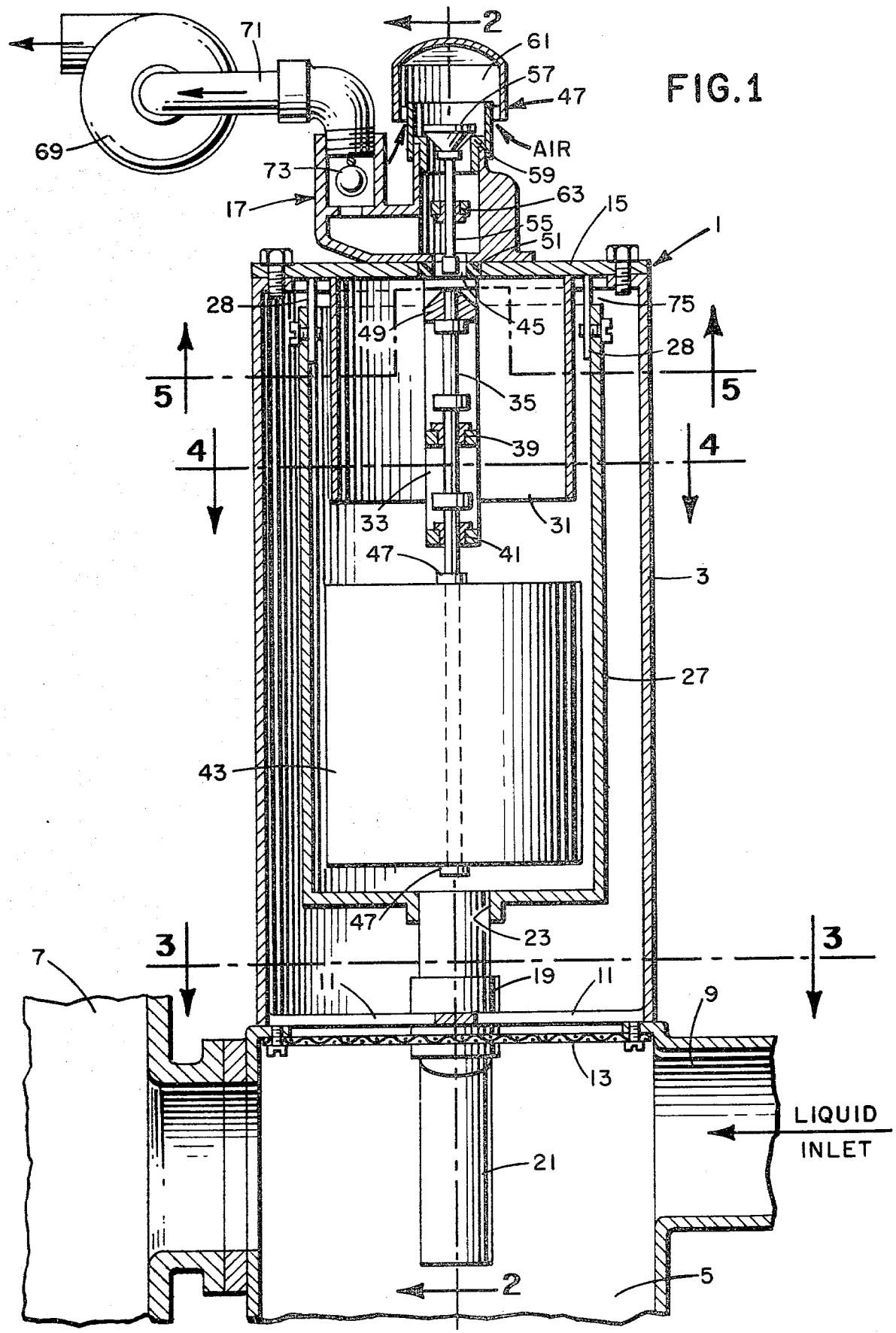
FIG. 1 is a vertical-sectional view of the pump valve assembly of the present invention.
Figure 2:
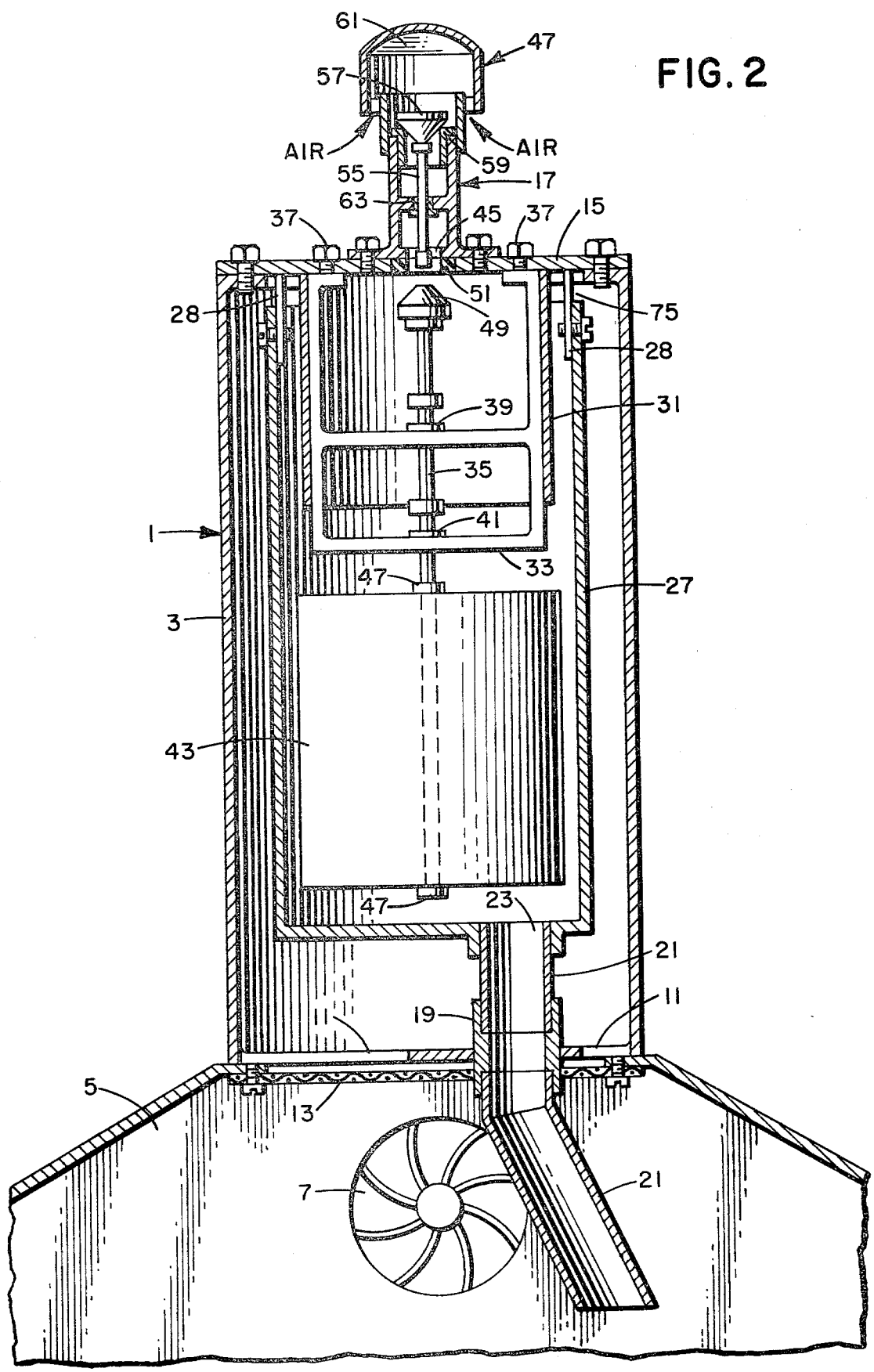
FIG. 2 is a vertical-sectional view rotated 90 degrees from FIG. 1; and taken along line 2—2 of FIG. 1.

Referring to the drawings in which like parts have the same numeral, gas separation device 1 comprises a cylindrically shaped tank member 3 mounted on the inlet chamber 5 of well-head pump 7. Liquid inlet 9 in chamber 5 is connected to a well or other liquid source to be pumped. The interiors of tank member 3 and inlet chamber 5 communicate through openings 11 in the bottom of tank 3 and an opening in the top of chamber 5 (not numbered). A screen means 13 across the opening in the top of chamber 5 may be provided to prevent any debris pumped into the inlet chamber from entering into the separation device. The top of tank 3 is covered by a head plate or cover 15 on which is mounted gas exhaust chamber 17. The interior of tank 3 communicates with gas exhaust chamber 17 through valve opening 45 which extends through the top of head plate 15 and through the wall of chamber 17. It will be appreciated that head plate 15 may be cast or molded as an integral part of tank 3, however, for ease of maintenance it is preferred that head plate 15 be removable. A cylindrically shaped container 27 is concentrically disposed and suspended within tank 3 by rigid hangers or straps 28 connected to head plate 15 in such manner that liquid reaching the top of tank 3 will spill over into container 27 through the space 75 between the top of container 27 and the bottom surface of head plate 15. An opening 23 is provided in the bottom of container 27. Conduit 21 which extends through the bottom of tank 3 and the top of pump intake chamber 5 by means of a journal 19 is connected on one end with opening 23, the other end extending into the interior of intake chamber 5 below the level of the pump intake impellers, vanes or other. It is essential that the portion of conduit 21 extending into chamber 5 be of such length that the opening into the conduit will be below the opening into the pump impelling chamber (not numbered).

A baffle member 31 integrally mounted on the underside of head plate 15 extends downwardly into container 27. In the preferred embodiment, baffle 31 is cylindrically shaped and concentrically arranged with respect to the interior surface of container 27. Also disposed within container 27 is a float member 43. Operatively mounted on float member 43 is a valve member 49 supported by a valve rod 35. As shown in the illustrated embodiment, valve rod 35 and valve member 49, is supported by a frame 33 connected by bolts 37 to head plate 15. As also shown in the illustrated embodiment, valve rod 35 is depicted as being journaled through openings 39 and 41 in frame 33 and securely connected to float member 43 on its lower end by stop collars 47. As mentioned hereinbefore, float member 43 provides an upward thrust to valve rod 35 when water rises in container 27. Valve member 49 acts to open and close opening 45 which is provided with valve seat 51. It will be appreciated by those skilled in the art that other means than a direct rod connection, for example, water level responsive means, may be readily used to open and close valve member 49.

In operative relationship to valve member 49 is an exhaust chamber valve assembly 47. When the exhaust chamber valve is opened, a passageway for atmospheric air is provided into the exhaust chamber 17. In the illustrated embodiment, valve assembly 47 comprises a valve stem or rod 55 connected to a poppet valve member 57, valve seat 59 and air intake chamber 61. Valve stem 55 is operatively mounted through a guide 63 connected to the walls of exhaust chamber 17. Valve assembly 47 operates in such manner that as valve member 49 closes opening 45 it engages valve stem 55 in such manner as to unseat poppet valve 57 whereby the exhaust chamber 17 is opened to the in-flow of atmospheric air. A ball check valve 73 is provided to prevent any backflow of gases through conduit 71 when vacuum pump 69 is shut down for any reason.

In operation, vacuum pump 69 creates a negative pressure in the gas exhaust chamber 17 causing check valve 73 to open and poppet valve 57 to close. Concomittantly, closing of valve 57 acting through valve rod 55 brings about the opening of valve 49 consequently lowering the pressure in separation tank 3, container 27 and pump intake chamber 5.

The reduced pressure or suction brought about by vacuum pump 69 and well-head pump 7 produces an insurge of liquid into intake chamber 5 through well pipe 9 from the liquid source. From intake chamber 5, liquid will rise into container member 27 through conduit 21 and liquid with entrained gases will rise into tank member 3 through the openings 11 in the bottom of tank 3 and the top of chamber 5. It is important to the operation of the device that the lower end of conduit 21 be submerged in the liquid in intake chamber 5 below the intake of the well-head pump.

As liquid with entrained gases rises in the space between the inner walls of tank 3 and outer walls of container member 27, the gases commence to separate and escape from the liquid. When the liquid, liquid entrained gas and gases reach the top of tank 3 they flow or spill over the top of container member 27 through space 75 and downwardly in the space created between the inner wall of the container member 27 and baffle 31. The liquids fall to the bottom of container 27 while the gases are drawn around the lower edge of the baffle member 31, rising within the confines of baffle 31, exiting out through opening 45 into exhaust chamber 17, and out through vacuum pump 69. The separated liquid falling to the bottom of container 27 merges with liquid which has risen into the container through conduit 21. It will be obvious that the liquid level in tank 3 and container 27 will fluctuate depending on the proportions of gases and liquid entering intake chamber 5 and the capacity of well-head pump 7.

As the liquid level within container 27 rises, float member 43 will rise and will, acting through rod 35, cause valve member 49 to close-off opening 45 into exhaust chamber 17. As valve member 49 closes, it contacts valve stem 55 causing the stem to move upwardly opening valve 57 to the flow of air from the atmosphere. When valve member 49 is in the closed position, the negative pressure created by vacuum pump 69 is cut off from the interior of the gas separation chamber 3 and liquid intake chamber 5 of the liquid pump 7.

When exhaust chamber 17 is opened to the in-flow of atmospheric air, the increased air pressure within the chamber serves to reduce the suction of pump 69 acting on the top surface of valve member 49. As liquid is pumped from the inlet chamber 5 by the well-head pump 7, the degased liquid in container member 27 flows downwardly through conduit 21 into intake chamber 5. The lowered liquid level in container 27 reduces the buoyancy exerted on float member 43 until the combined weight of the float 43 and rod assembly 35 is greater than the negative pressure acting above valve member 49. Float member 43 will then move downwardly with the falling liquid level. As float member 43 moves downwardly, valve member 49 opens and valve member 57 is consequently closed. Upon the opening of valve member 49, liquid will again rise into the separation device repeating the cycle.

Preferably, the rise and fall of liquid within the separation device is maintained within a fairly narrow range by the opening and closing of valve 49. This is desirable inasmuch as it facilitates the operation of the pumps under substantially constant load conditions. Alternatively, the float 43 and float rod 35 elements and the valve 57 and stem 55 members can be arranged in such manner that as valve 49 first contacts the lower portion of valve stem 55, valve 57 will be opened partially. This arrangement brings about the entrance of a relatively small amount of air at atmospheric pressure into the system thus causing the suction of pump 69 to be only slightly reduced in the separation chamber and the liquid level within the float chamber 27 to fall only slightly. If such an arrangement is desired, a judicious choice of size, position, or buoyancy of float 43 will enable the liquid level within chamber 23 to be maintained within a narrow range of fluctuation. It will be recognized that this arrangement reduces the "inertia" or "lag" in the opening and closing of valves 49 and 57 since it will require a greater force to open the valves than it would to keep them open. Thus, a steadier and more constant water level within container 27 is insured without the wide fluctuations normally present in prior art devices. The above described arrangements aid in maintaining optimum air separation conditions within assembly 1 while permitting minimum moisture to reach the air pump 69.

The amazing results accomplished with the device of the invention has been attributed to the particular geometry or arrangement of the flow path of the moisture laden air between the inside of tank 3 and baffle members 27 and 31 to which is attributed the phenomena of providing a simple and practical device for separation of the liquid and gases being impelled toward the vacuum pump 69. The air and moisture mixture is shirred between the walls of tank 3 and container 27 thereafter striking the bulkhead formed by the top 15 of tank 3. The mixture then flows over the top of and into container 27. At this point the mixture is thoroughly agitated since it must completely reverse direction as it is drawn by negative pressure downwardly between the inner walls of container 27 and baffle 31. The combination of the agitation and shirring action of the direction changes and respective baffle actions together with the negative pressure within the chambers causes the air-liquid mixture to be substantially completely separated as the liquid falls toward the bottom of container member 27.

It will be appreciated from the foregoing description that since substantially all of the air entrained in the liquid entering the system is removed well before reaching the vacuum pump, substantially little moisture reaches the vacuum pump to cause sludging and premature failure of the pump parts. Moreover, water reaching the centrifugal pump is deaerated thus denser, allowing the centrifugal pump to pump a greater volume of water for a given period of time.

Thus it can be appreciated that the present invention possesses many advantages over prior art pump valve devices. While the pump valve assembly of the present invention has been described in considerable detail, it is understood that various changes and modifications may occur to persons of ordinary skill in the art without departing from the spirit and scope of the invention as is defined in the appended claims.

What is claimed is:

1. A gas-liquid separation device for separating gas from liquids in a system which includes a liquid pump means and a gas vacuum pump means comprising:

a tank member enclosed at its top and adapted to communicate through its bottom for receiving gas entrained liquid to be separated from the intake chamber of the liquid pump means;

a container member mounted within said tank member;

a conduit connecting the interior of said container member and the intake chamber of the liquid pump means, said conduit terminating in said intake chamber at a point below the liquid entrance into the liquid pumping chamber of the pumping means;

a baffle member concentric with the periphery of the walls of said container member connected to the top of said tank member and extending downwardly into said container member;

means responsive to the liquid level in said container member;

a gas discharge valve means in the top of said tank member within the area defined by the walls of said baffle member, said gas discharge valve means being operatively connected to said liquid level responsive means in said container member;

a gas exhaust chamber connected with the vacuum pump means and said gas discharge valve means;

an air valve to the atmosphere in said exhaust chamber;

means for connecting said air valve with said gas discharge valve whereby the movement of one of said valves is responsive to the movement of the other.

2. The gas-liquid separation device of claim 1 wherein the liquid level responsive means in said container member is a float.

3. The gas-liquid separation device of claim 2 wherein said gas discharge valve means comprises a valve rod connected directly to said float member in such manner that when said float rises said valve means is closed to the flow of gases from the separation device.

4. The gas-liquid separation device of claim 1 wherein said container member is concentrically arranged within said tank member and positioned in such manner that liquids and gases flowing to the top of said tank member spill over into said container member.

5. The gas-liquid separation device of claim 1 wherein said baffle member is cylindrically shaped and concentrically arranged with respect to the inner walls of said container member.

6. The gas-liquid separation device of claim 1 wherein the means for connecting said air valve and said gas discharge valve comprises a valve rod mounted on said air valve in such manner as to contact said gas discharge valve and respond to its movements.

7. The gas-liquid separation device of claim 1 wherein said gas exhaust chamber comprises valve means to prevent the back-flow of gases from the gas vacuum pump means.

8. A gas-liquid separation device for separating gas from liquids in a system which includes a liquid pump means and a gas vacuum pump means comprising:

a cylindrically shaped tank member having openings in the bottom thereof receiving liquid and gases to be separated from the intake chamber of the liquid pump means;

a cylindrically container member suspended and concentrically arranged within said tank member;

a conduit for the flow of liquid to and from said container member and the intake chamber of said liquid pump and said conduit terminating within said intake chamber at a point below the entrance to the liquid pumping chamber of the liquid pumping means;

a cylindrically shaped baffle member mounted on the top of said tank member and extending downwardly into, and concentrically with said container member;

float means responsive to liquid level in said container member;

gas discharge valve means in the top of said tank member within the area defined by the periphery of said baffle member;

rod means for connecting said float means and said gas discharge valve means whereby the raising of the liquid level in said container member effects the closing of said valve means;

a gas exhaust chamber connected with the vacuum pump means and said gas discharge valve means;

an air valve to the atmosphere in said gas exhaust chamber;

means comprising a rod member on said air valve for operatively connecting said air valve with said gas discharge valve whereby the movement of one of said valves brings about a counter movement of the other; and valve means within said gas exhaust chamber to prevent back-flow of gases from the gas vacuum pump means.

9. In a pump for pumping liquids having large volumes of gases entrained therein, the improvement comprising a tank member enclosed at its top and substantially open at its bottom and mounted on the intake chamber of the pump in such manner whereby the interior of said tank member is in substantially open communication with the liquid with entrained gas flowing into the interior of said pump intake chamber;

a container member mounted within said tank member;

a conduit connecting the interior of said container member and said pump intake chamber, said conduit terminating in said intake chamber at a point below the liquid level in said pump intake chamber;

a baffle member connected with the top of said tank member and extending downwardly into and concentrically arranged with respect to the walls of said container member;

means responsive to liquid level in said container member;

a gas discharge valve means in the top of said tank member with the area defined by the periphery of said baffle member;

means connected to said liquid level responsive means operatively connected to said gas discharge valve means;

a gas exhaust chamber connected with said gas discharge valve means;

gas pumping means connected with said exhaust chamber;

an air valve to the atmosphere in said exhaust chamber;

means for connecting said air valve with said gas discharge valve whereby the movement of one of said valves is responsive to the movement of the other.

* * * * *